US006437882B1

(12) United States Patent
Kanematsu et al.

(10) Patent No.: US 6,437,882 B1
(45) Date of Patent: *Aug. 20, 2002

(54) CONTROL APPARATUS FOR AVOIDING EQUIPMENT ABNORMALITY

(75) Inventors: Shinichi Kanematsu, Kawasaki; Ken Kuroda, Yokohama, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,256

(22) Filed: Nov. 18, 1997

(30) Foreign Application Priority Data

Nov. 19, 1996  (JP) .............................. 8-308012

(51) Int. Cl.⁷ ............................ H04N 1/00; G06F 11/00
(52) U.S. Cl. ...................... 358/437; 358/434; 358/468; 399/9; 399/11
(58) Field of Search ................................. 358/400, 402, 358/406, 434, 437, 468; 395/113, 181, 182.13, 183.22, 185.1; 399/81, 8, 9, 10, 11; 371/5.1, 26; 345/117, 333, 334, 336, 337, 338

(56) References Cited

U.S. PATENT DOCUMENTS

| | | | | |
|---|---|---|---|---|
| 5,115,501 A | * | 5/1992 | Kerr ............................... 707/9 |
| 5,202,726 A | * | 4/1993 | McCulley et al. ............ 399/81 |
| 5,230,628 A | * | 7/1993 | Kaneko et al. ............. 358/400 |
| 5,243,382 A | * | 9/1993 | Takano et al. ................. 399/8 |
| 5,282,127 A | * | 1/1994 | Mii ................................ 700/1 |
| 5,333,062 A | * | 7/1994 | Hara et al. ................... 358/437 |
| 5,386,271 A | * | 1/1995 | Maekawa et al. .............. 399/8 |
| 5,412,452 A | * | 5/1995 | Rego et al. .................... 399/11 |
| 5,467,449 A | * | 11/1995 | Gauronski et al. ........ 395/185.1 |
| 5,557,549 A | * | 9/1996 | Chang ......................... 702/183 |
| 5,579,126 A | * | 11/1996 | Otsuka ........................ 385/403 |
| 5,583,617 A | * | 12/1996 | Altrieth, III et al. .......... 399/81 |
| 5,613,150 A | * | 3/1997 | Yamada ....................... 345/336 |
| 5,630,044 A | * | 5/1997 | Suzuki .................. 395/182.03 |
| 5,666,585 A | * | 9/1997 | Nagira et al. ................. 399/10 |
| 5,737,739 A | * | 4/1998 | Shirley et al. .............. 707/512 |
| 5,748,880 A | * | 5/1998 | Ito et al. ................ 395/183.22 |
| 5,774,118 A | * | 6/1998 | Hatakama .................... 345/337 |
| 5,877,961 A | * | 3/1999 | Moore ......................... 700/180 |
| 5,950,148 A | * | 9/1999 | Nakagawa et al. ......... 702/182 |

FOREIGN PATENT DOCUMENTS

| | | | | |
|---|---|---|---|---|
| JP | 62-262120 | * | 11/1987 | ............. G06F/3/02 |
| JP | 63-66623 | * | 3/1988 | ............. G06F/3/02 |

* cited by examiner

*Primary Examiner*—Edward Coles
*Assistant Examiner*—Joseph R. Pokrzywa
(74) *Attorney, Agent, or Firm*—Fitzpatrick, Cella, Harper & Scinto

(57) ABSTRACT

When a job is executed in an image processing apparatus, a user is recognized by inputting a user ID from an operation unit. When an abnormality such as interferes with execution of the job occurs, data indicative of avoidance countermeasures for each user or each type of abnormality stored in a memory is referred to and the plural avoidance countermeasures are displayed sequentially from the one that is most frequently executed, and an optimum one is selected. After that, the frequency data for the selected avoidance countermeasure is renewed.

26 Claims, 15 Drawing Sheets

TROUBLE AVOIDANCE TABLE

FIG. 8

| | |
|---|---|
| 801 | JOB ID |
| 802 | USER ID |
| 803 | PROCESSING UNIT (PRINTER, FACSIMILE, COMPUTER I/F) |
| 804 | PROCESSING STATUS (IN PROCESSING, STANDBY, ERROR, ERROR IS ALREADY AVOIDED) |
| 805 | CONTENT OF PROCESS |
| 806 | CONTENT OF ERROR |
| 807 | CONTENT OF ERROR AVOIDING PROCESS |

TROUBLE AVOIDANCE COUNTERMEASURE TABLE

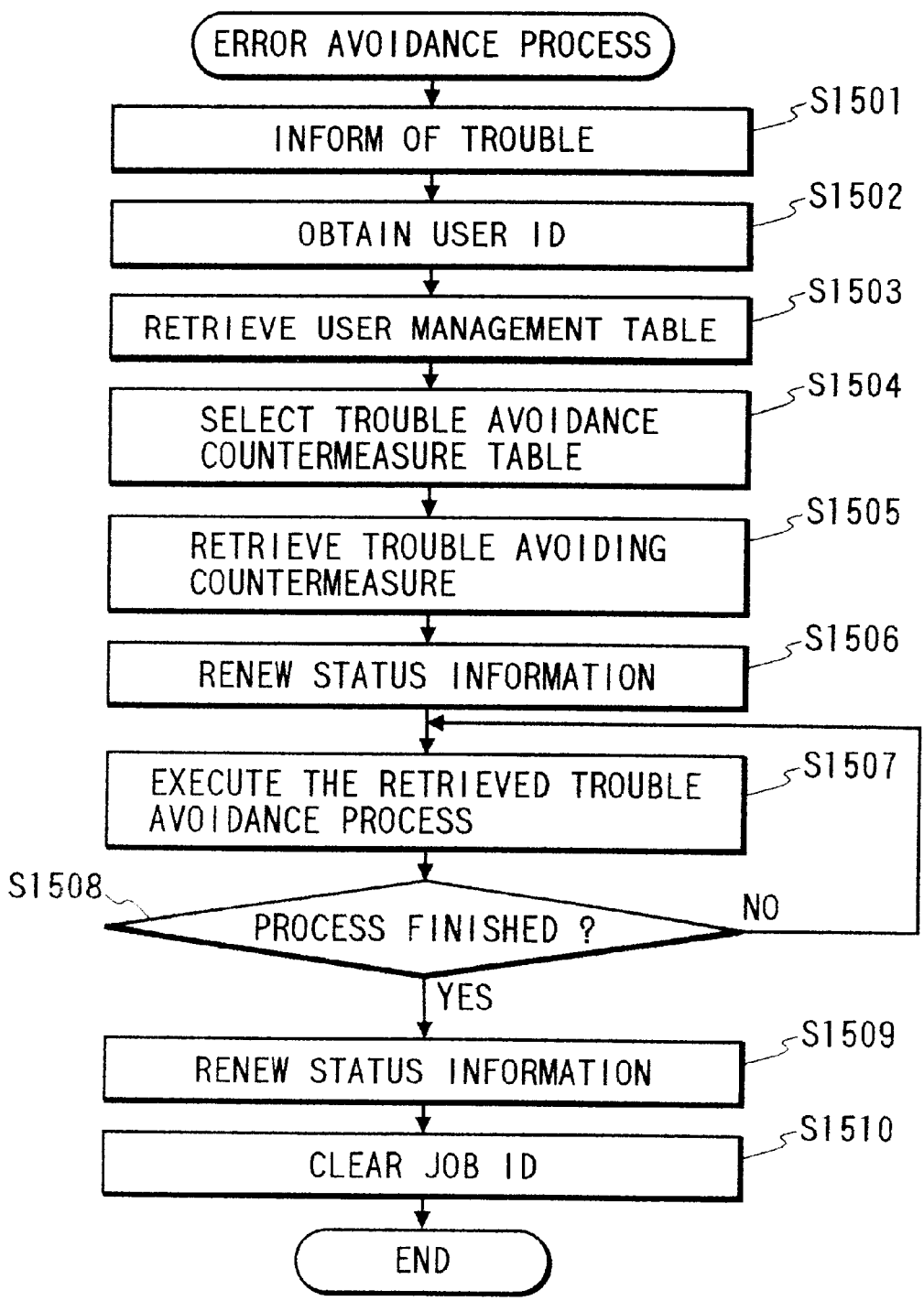

CONTROL APPARATUS FOR AVOIDING EQUIPMENT ABNORMALITY

BACKGROUND OF THE INVENTION

1. Field of the Invention

This invention relates to a control apparatus for avoiding equipment abnormalities.

2. Related Background Art

A combined image processing apparatus having facsimile and printer capabilities as well as a copying function has been recently considered.

When using such an apparatus for printing out a document or drawing created by a computer, a printer driver on the computer converts it to data in a page description language (PDL), and on receipt of the converted data a printer formatter unit formats a layout or drawing procedure to form and print out a desired image.

In this case, the apparatus has a function for sending information of the printer formatter unit, such as online/offline switching, various error statuses indicative of no sheet or the like and a busy state indicative of another job being processed.

The use of the apparatus as the facsimile unit permits an operator to receive notice of image transmission information indicating that a communication partner is ready, or that the image is being transmitted or received together with an abbreviated name of the communication partner. It can also store a history of communication results, the communication time and date, abbreviated names of communication partners and their telephone numbers, and it can inform the operator of the historical information.

When using a filing function, the apparatus permits the operator to receive such processing status as indicates that data is being recorded, a file is being retrieved or the disk is write-protected.

Combinations of these functions permit the apparatus to perform the following compound control operations.

(1) Print data is developed in the printer formatter unit and transferred to the facsimile unit so that the data transferred can be compressed in the facsimile unit for facsimile transmission via public lines.

(2) When filing a document created by the computer or the like, the document data is developed in the printer formatter unit in the same manner as when printing it on a sheet, and transferred to a filing unit, so that the filing unit stores the transferred image data in a magneto-optical disk.

(3) When filing an image received by the facsimile, the image received and expanded is transferred to the filing unit in the same manner as when printing it on a sheet, so that the filing unit stores the transferred image in a magneto-optical disk.

During the compound control operations, various processing statuses equivalent to those in respective single-control operations can be informed.

However, when trouble occurs and the corresponding processing can not be continued, the operator is informed of insufficient information such as only the type of error. It is therefore necessary for the operator to ignore the error and instruct continuation of the processing or to terminate the current job once and initiate the job again. To know the progress status of the job, the operator has to judge and select units related to the processing from among the printer formatter unit, the facsimile unit and the filing unit, and to monitor respective information of the units regarded as related to the processing. For this reason, adequate sense and complex confirmation work are required for obtaining information indicative of whereabouts in all the processing one particular job is located.

SUMMARY OF THE INVENTION

An object of the present invention is to provide control apparatus and method for abnormality avoidance, which can overcome the above drawbacks.

Another object of the present invention is to provide a control apparatus and method for abnormality avoidance, which can store a history of abnormality avoiding operations for each user so that when an error occurs, a sequence of operations selected in the past will be provided.

Still another object of the present invention is to provide a control apparatus and method for changing a guidance of abnormality avoiding operations according to the frequency of abnormality avoiding operations selected by the user in the past.

Yet another object of the present invention is to provide a control apparatus and method for abnormality avoidance, which can provide a proper guidance of abnormality avoiding operations even when no user is recognized.

The other objects of the present invention will be apparent from the following description and the appended claims when considered in connection with the accompanying drawings.

BRIEF DESCRIPTION OF THE DRAWINGS

In the drawings:

FIG. 8 is a diagram showing a status information management table;

FIG. 15 is a flowchart of a trouble avoidance countermeasure selecting process executed when trouble occurs in the second embodiment.

DETAILED DESCRIPTION OF THE PREFERRED EMBODIMENTS

Referring to the accompanying drawings, preferred embodiments of the present invention will be described below.

Figure 1:
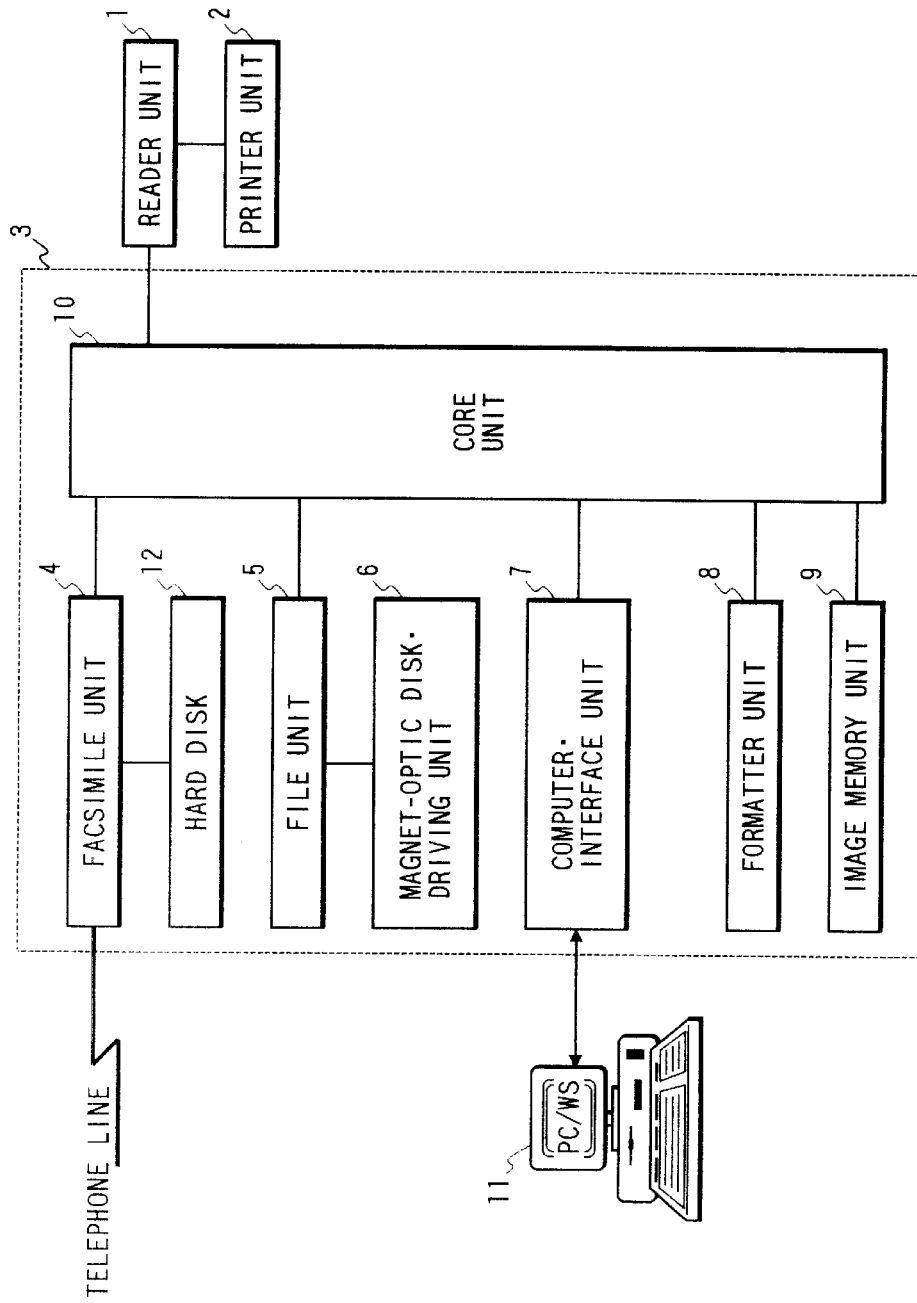
FIG. 1 is a block diagram of an image processing apparatus according to an embodiment of the present invention.

FIG. 1 is a block-diagram showing structure of an image processing apparatus according to an embodiment of the present invention. A reader unit 1 reads an image on a document and outputs image data corresponding to the original image to a printer unit 2 and an image input/output control unit 3. The printer unit 2 records on a sheet the image corresponding to the image data from the reader unit 1 and the image input/output control unit 3. The image input/output control unit 3 is connected to the reader unit 1, which includes of a facsimile unit 4, a file unit 5, a computer interface unit 7, a formatter unit 8, an image memory unit 9 and a core unit 10.

The facsimile unit 4 expands compressed image data received via a telephone line, and transfers the expanded image data to the core unit 10. It also compresses the image data from the core data 10 and transfers the compressed data via a telephone line.

A hard disk 12 is connected to the facsimile unit 4, which receives and temporarily stores compressed data.

A magneto-optic disk drive unit 6 is connected to the file unit 5. The file unit 5 compresses image data transferred from the core unit 10 and stores the compressed image data, together with a key word for retrieval of the image data, in a magneto-optic disk set in the magneto-optic disk drive unit 6. The file unit 5 also retrieves, based on the key word, the compressed image data stored in the magneto-optic disk, reads and expands the compressed data retrieved, and transfers the expanded image data to the core unit 10.

The computer interface unit 7 is an interface between the core unit 10 and a personal computer or workstation (PC/WS) 11.

On receipt of an image from the PC/WS 11, the formatter unit 8 develops code data indicative of the image so that the printer unit 2 can record the developed image data. The image memory unit 9 temporarily stores the image data transferred from the PC/WS 11.

As will be described later, the core unit 10 controls the data flow between the reader 1 and the respective main units in the image input/output control unit 3, namely, the facsimile unit 4, file unit 5, the computer interface 7, the formatter unit 8, the image main memory 9.

Figure 2:
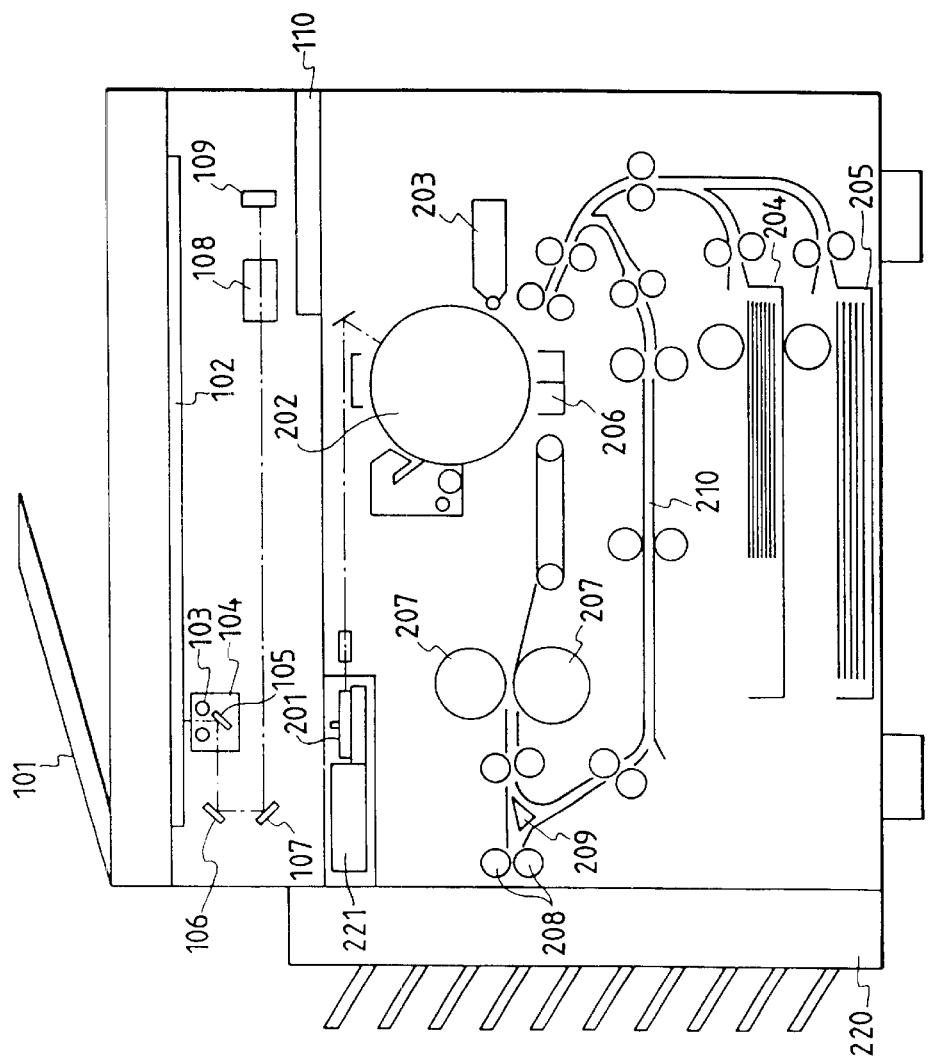
FIG. 2 is a sectional view of a reader unit and a printer unit.

FIG. 2 is a sectional view of the reader unit 1 and the printer unit 2. A document feeder 101 of the reader unit 1 feeds sheets of document onto a platen glass 102 one by one consecutively from the last page, and ejects the document on the platen glass 102 after completion of document reading operation. When a document sheet is fed onto the platen glass 102, a lamp 103 is turned on to start moving a scanner unit 104 so that the document can be exposed and scanned. The reflected light from the document is led to a CCD image sensor (hereinbelow, referred to as CCD) 109 through mirrors 105, 106, 107 and a lens 108. An image on the document is thus read by the CCD 109. The image data output from the CCD 109 is processed in a predetermined processing and transferred to the printer unit 2 and the core unit 10 in the image input/output control unit 3.

A laser driver 221 of the printer unit 2 drives a laser light emission unit 201 to emit laser light according to the image data output from the reader unit 1. The laser light is radiated onto a photosensitive drum 202 to form a latent image on the photosensitive drum 202 according to the laser light. Developer is adhered to the latent image area on the photosensitive drum 202. A sheet of recording paper is fed from either of cassettes 204 and 205 at timing of synchronization with start of laser light radiation, and conveyed to a transfer unit 206 in which the developer adhered on the photosensitive drum 203 is transferred to the recording paper. The recording paper with the developer thereon is then conveyed to a fixing unit 207 and the developer is fixed on the recording paper due to the application of heat and pressure by the fixing unit 207. The recording paper passed through the fixing unit 207 is ejected by an eject roller 208 and stored in a corresponding one of bins by a sorter 220. When a sorting mode is not set, the sorter 220 stores the recording paper in the topmost bin. In a two-side recording mode, the sorter 220 inverses the rotating direction of the recording paper conveyed to the eject roller 208 and a flapper 209 leads it to a paper re-feed line. In a multi-recording mode, the flapper 209 leads the recording paper to the paper re-feed line before the recording paper is conveyed to the eject roller 208. The recording paper led to the paper re-feed line 210 is fed to the transfer unit 206 at the timing described above.

Figure 3:
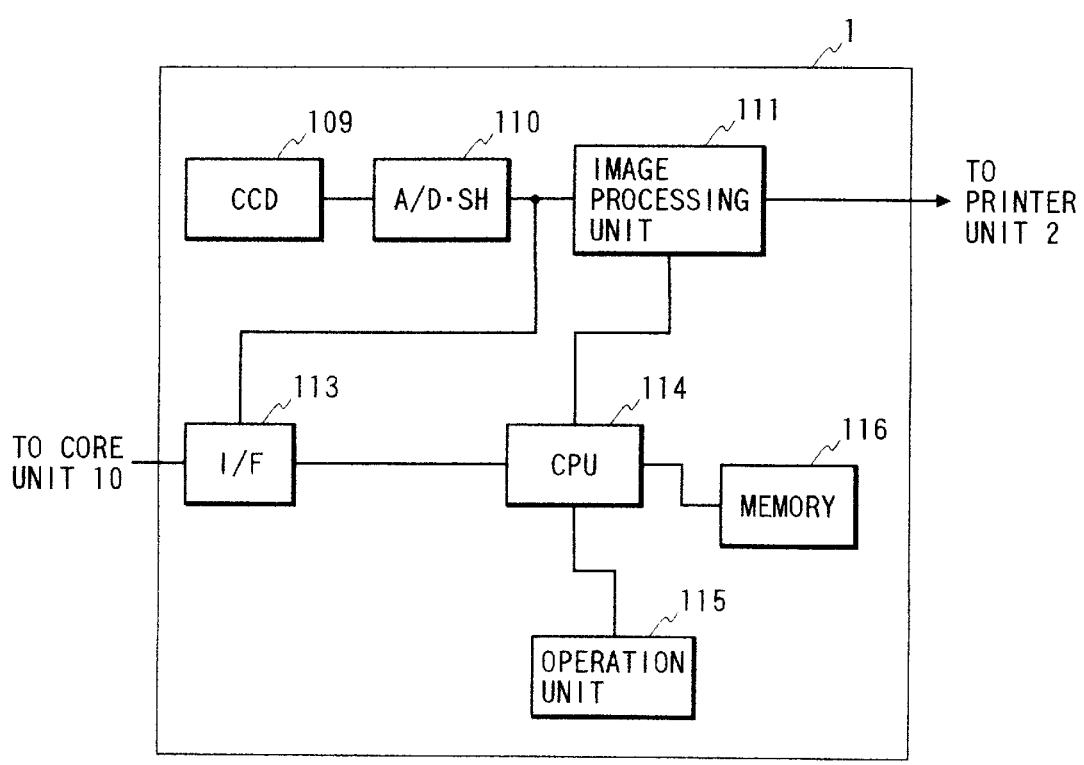
FIG. 3 is a block diagram of the reader unit.

FIG. 3 is a block diagram of the reader unit 1. The image data output from the CCD 109 is subjected to analog/digital conversion and shading correction at an A/D SH unit 110. The image data processed by the A/D SH unit 110 is transferred to the image input/output control unit 3, i.e., through an image data processing unit 111 to the printer 2 and through an interface unit 113 to the core 10, respectively. A CPU 114 controls the image processing unit 111 and the interface unit 113 according to the content set in an operation unit 115. For example, when a copy mode for performing a copy operation after trimming processing is set in the operation unit 115, the CPU 114 instructs the image processing unit 111 to process the image data in a trimming processing and to transfer it to the printer unit 2. When a facsimile transmission mode is set in the operation unit 115, it instructs the interface unit 113 to transfer to the core unit 10 the image data together with a control command corresponding to the set mode. Such a control program executed by the CPU 114 is stored in a memory 116 so that the CPU 114 can perform control while referring to the memory 116. The memory 116 is also used as a work area for the CPU 114.

Figure 4:
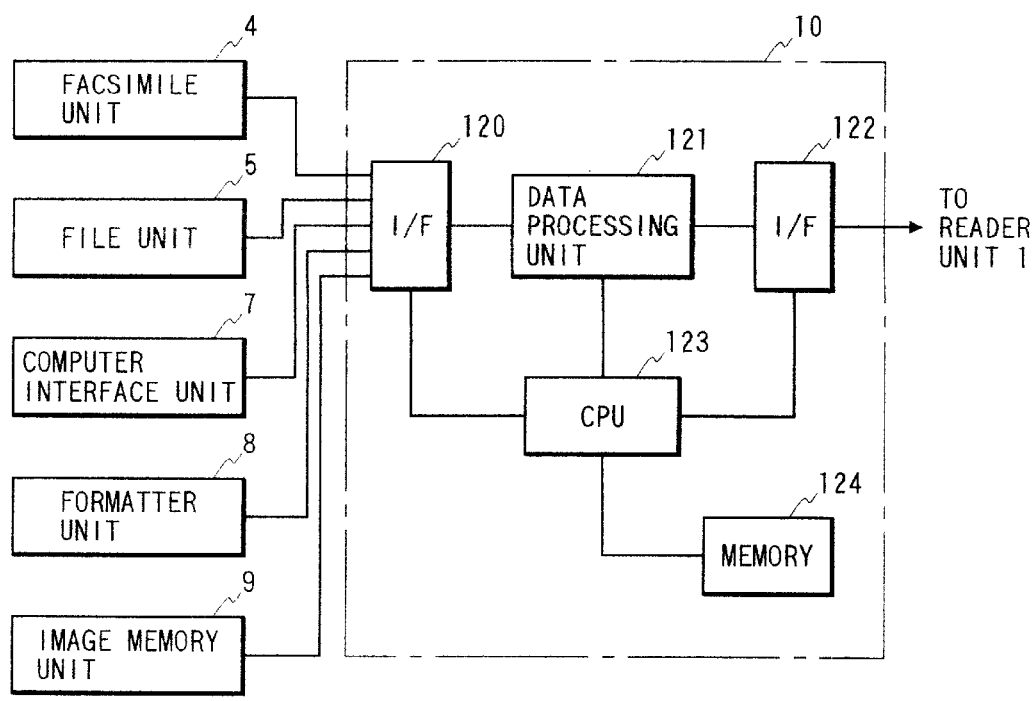
FIG. 4 is a block diagram of a core unit.

FIG. 4 is a block diagram of the core unit 10. The image data from the reader unit 1 is transferred to a data processing unit 121, while the control command from the reader unit 1 is transferred to a CPU 123, each being transferred through the interface 122. The data processing unit 121 performs image processings such as image rotating processing and magnification changing processing. The image data transferred from the reader unit 1 to the data processing unit 121 is then transferred through the interface 120 to the facsimile unit 4, the file unit 5 or the computer interface unit 7 according to the control command transferred from the reader unit 1. On the other hand, the code data indicative of the image input through the computer interface unit 7 is transferred to the data processing unit 121, then to the formatter unit 8. The code data is developed into image data, and the image data developed is transferred to a desired unit such as the facsimile unit 4 or the reader unit 2 after being transferred to the data processing unit 121. The image data from the facsimile unit 4 is transferred to a desired unit such as the printer unit 2, the file unit 5 or the computer interface unit 7 after being transferred to the data processing unit 121. The image data from the file unit 5 is similarly transferred to a desired unit such as the printer unit 2, the facsimile unit 4 or the computer interface unit 7 after being transferred to the data processing unit 121. The CPU 123 performs control operations mentioned above in accordance with a control program stored in a memory 124 and the control command transferred from the reader unit 1. The memory 124 is also used as a work area for the CPU 123. The image processing apparatus is thus permitted to carry out combined functions such as reading of an image on a document, image printing, image transmission, storage of the image and input or output of data from a computer.

The above-mentioned main units, such as the reader unit 1, the printer unit 2, the facsimile unit 4, the file unit 5, the computer interface unit 7 and the formatter unit 8, are provided with individual abnormality detecting circuits, respectively, which, when an abnormality occurs, transmit information indicative of an abnormality of each unit through the core unit 10 to the reader 1 so that the abnormality can be displayed by an indicator of the operation unit 115. Status information of each unit is also displayed by the indicator of the operation unit 115 in the same manner.

Figure 5:
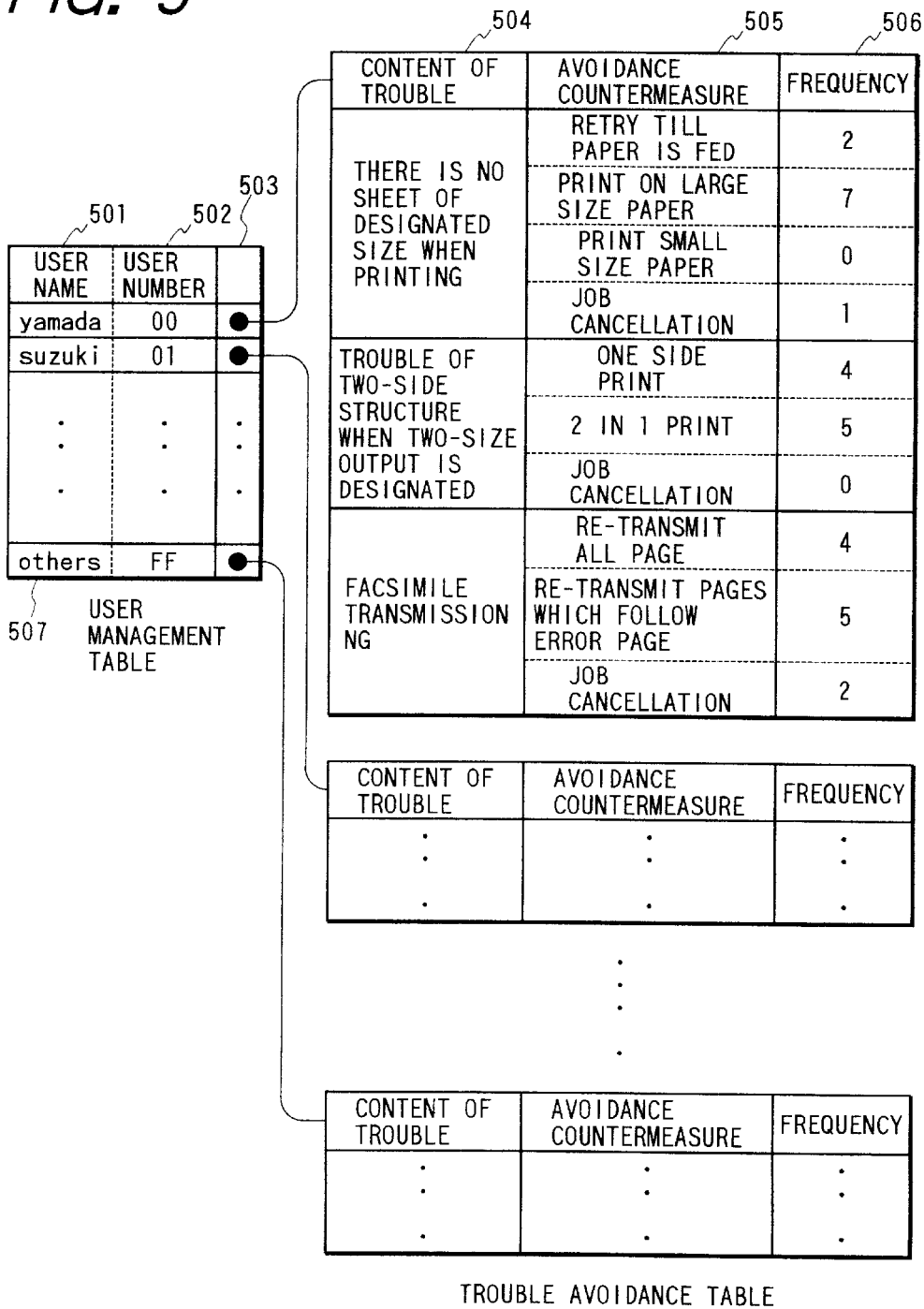
FIG. 5 is a diagram showing a user management table.
Figure 6:
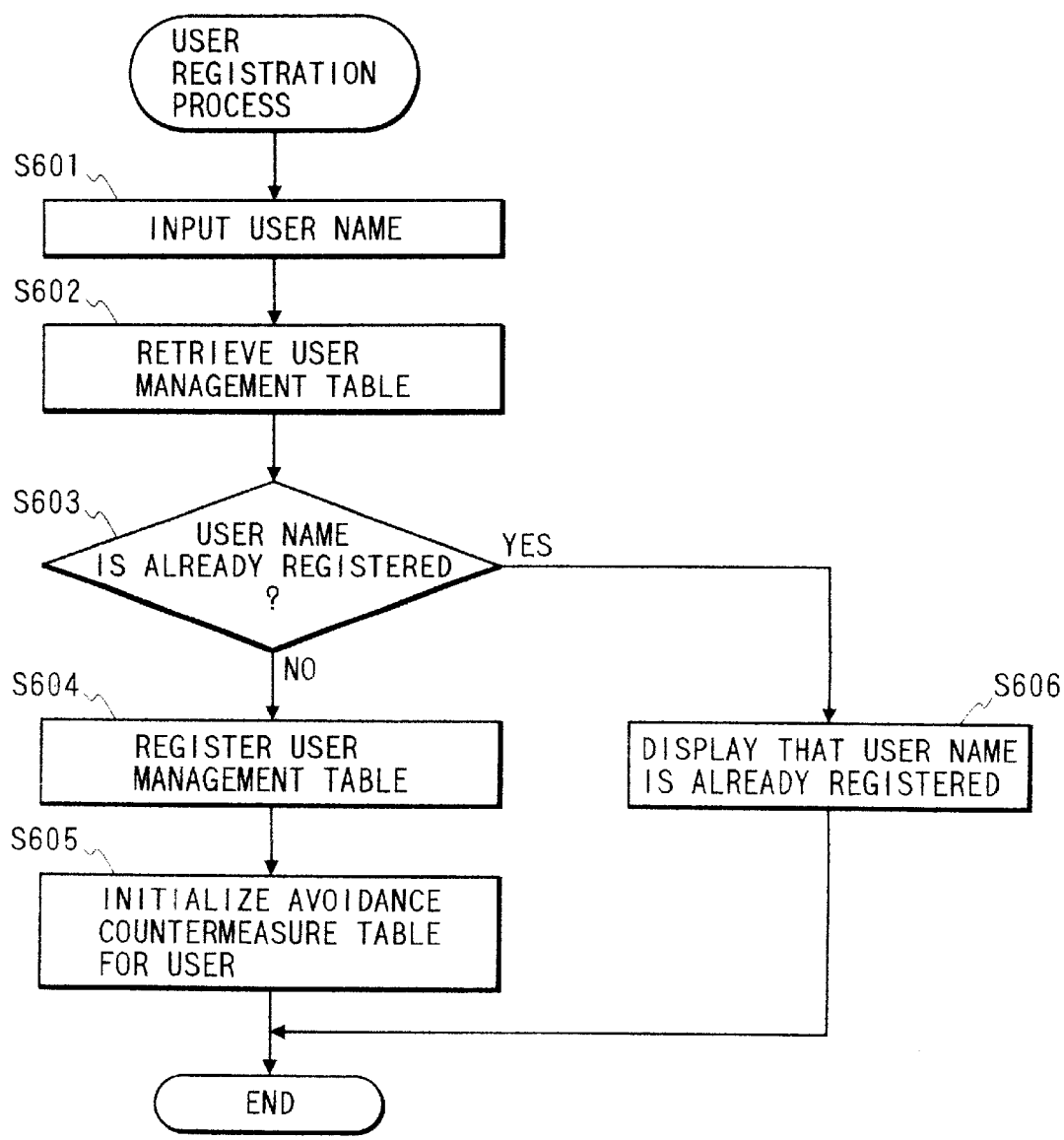
FIG. 6 is a flowchart of a user registering process.

In this embodiment, when an abnormality occurs, an optimum countermeasure can be selected by each user. Referring next to FIGS. 5 and 6, a procedure for user registration will be described.

FIG. 5 shows a user management table for managing registered user information, in which a column 501 is for storing user names, a column 502 is for storing user IDs and a column 503 is for storing positions of trouble avoidance countermeasure tables for individual users. The trouble avoidance countermeasure table 503 is provided for each user, in which a column 504 is for storing the content of troubles, a column 505 is for storing alternative trouble avoidance countermeasures and a column 506 is for storing the frequency of specification in the past. The user management table is provided in a predetermined area of the memory 116.

The following is a description of a user registering process. At first, a user inputs his or her name through the operation unit 115 at S601. The CPU 114 retrieves the user name from the user management table at S602 and determines at S603 whether or not the user name has already been registered. If registered, the CPU 114 instructs the operation unit 115 to indicate that the user name has already been registered at S606. If not registered, the user name is registered in the column 501 of the user management table at S604. Then, a new user ID is assigned so that the one-to-one correspondence can be shown between the user name and the user ID. The new user ID is registered in the column 502. At S605, an area of a trouble avoidance countermeasure table for the newly registered user is secured and initialized.

When the user starts an execution of a job in the image processing apparatus, the user inputs his or her name through the operation unit 115 prior to execution of the job. The user name is then certified and used when selecting the trouble avoidance countermeasure table for the user. The user ID input method is not limited by input through the operation unit 115, and it may be performed by reading data of a user ID card in the apparatus.

Figure 7:
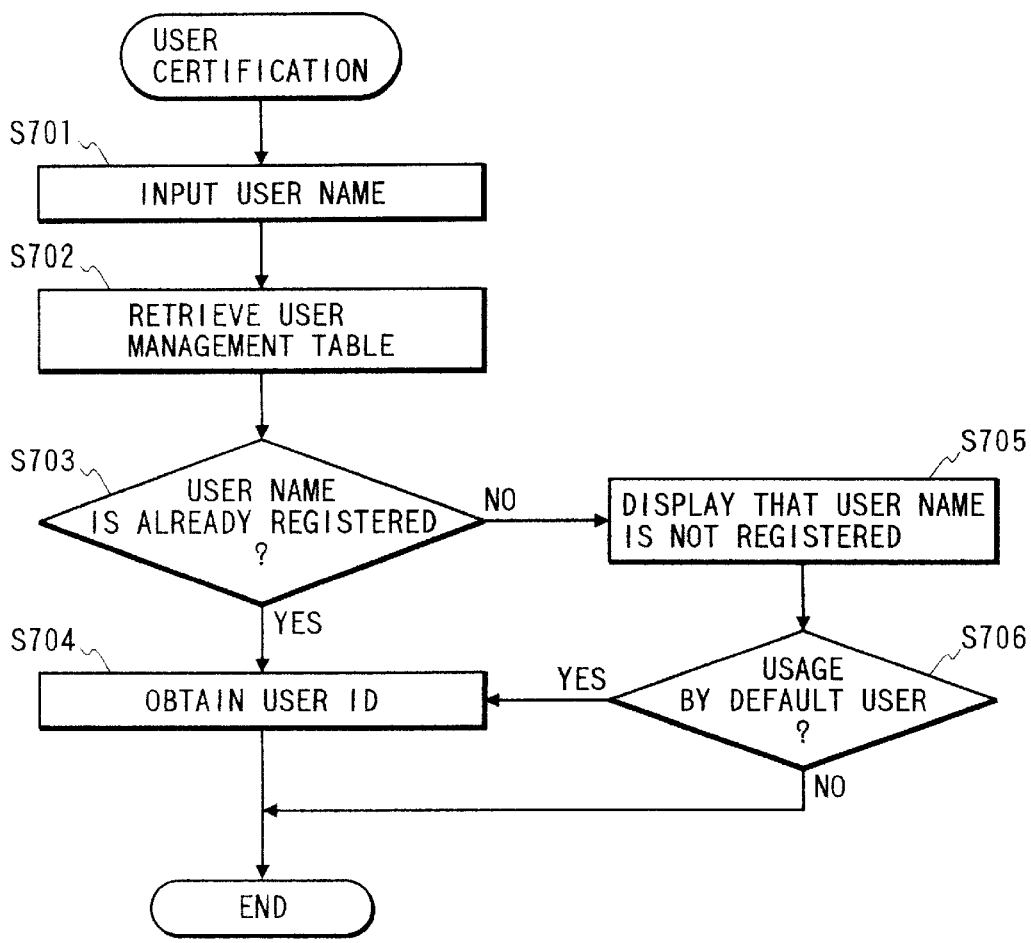
FIG. 7 is a flowchart of a user certifying process.

Referring to FIG. 7, a procedure for user certification will be described below.

At first, the user name is input by the user through the operation unit 115 at S701. The CPU 114 retrieves the user name from the user management table at S702 and determines at S703 whether or not the user name has already been registered. If registered, the user ID is obtained from the column 502 at S704. If not registered, the CPU 114 instructs the operation unit 115 at S705 to inform the user that the user name has not been registered yet, then at S706, to make the user select whether to use the apparatus without registration of the user name. When initiating the job without registration of the user name, a default user name "others" indicative of indefinite users is given as shown in a column 507, and a default user ID is obtained at S704. The default user name and the default user ID are used to select and execute the trouble avoidance countermeasure table registered therefor.

Next, description will be made to an exemplary processing executed according to the type of job by the combined image processing apparatus of the present invention.

FIG. 8 shows a management table indicative of status information of the job, which is provided in the memory 124.

The status information management table is a management table for grasping processing progress status of the core unit 10, in which the processing progress status is renewed sequentially in response to input of data from the core unit 10, the printer formatter unit 8 and the facsimile unit 4. The status information management table is composed of a column 801 for storing job IDs as management numbers, a column 802 for storing user IDs used for identifying the user who currently owns the job, a column 803 for indicating a processing unit currently executing the job, a column 804 for storing current processing progress status, a column 805 for storing the content of processings, a column 806 for storing the content of errors occurring during processings and a column 807 for storing the content of error avoiding processes.

Figure 9:
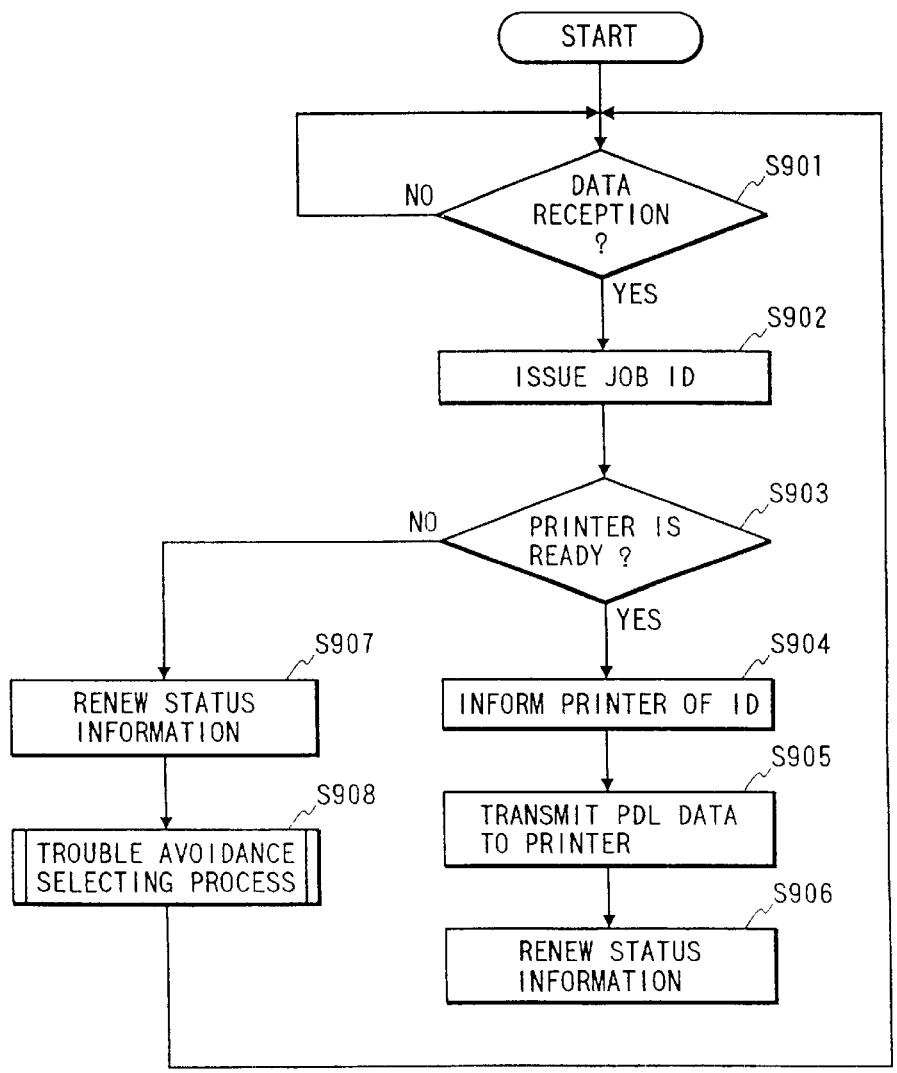
FIG. 9 is a flowchart showing an operation executed by a computer interface unit 7.

Referring to FIG. 9, description will be made of the operation of the entire apparatus when PDL data is received from the computer and transferred to the printer formatter unit 8.

At S901, the CPU 123 of the core unit 10 determines whether or not PDL data is received from the computer through the interface unit 7. The core unit 10 is designed to receive data from the computer in each processing unit (hereinbelow, the processing unit is referred to as a job). When detecting data reception, the core unit 10 issues a job ID at S902 for use as a management number so as to show the one-to-one correspondence to the data received. After that, the job ID and the user ID indicative of the owner of the job are used to grasp and inquire the processing status.

Subsequently, the CPU 123 recognizes the state of the printer formatter unit 8 at S903. If the printer formatter unit 8 is in a state where the PDL data cannot be received for some reason, the column 804 of the status information management table is renewed at S907 to transmit the data of the status information management table to the CPU 114. Then, the operation shifts to the trouble avoidance selecting process of S908, and the CPU 114 displays alternative avoidance countermeasures corresponding to the content of each trouble in the order of the frequency of specification in the past so that the user can select an optimum countermeasure for continuation of the processing. Details will be described later with reference to FIG. 10. On the other hand,,when the CPU 123 recognizes at S903 that the printer formatter unit 8 is ready for data reception, the job ID issued at S902 is informed to the printer formatter unit 8 at S904, and then the PDL data is transferred to the printer formatter unit 8 at S905. After that, the column 803 of the status information management table is renewed at S906 so as to indicate that the processing is transferred to the printer formatter unit 8, and the operation is returned to S901 for the next data reception from the computer.

Figure 10:
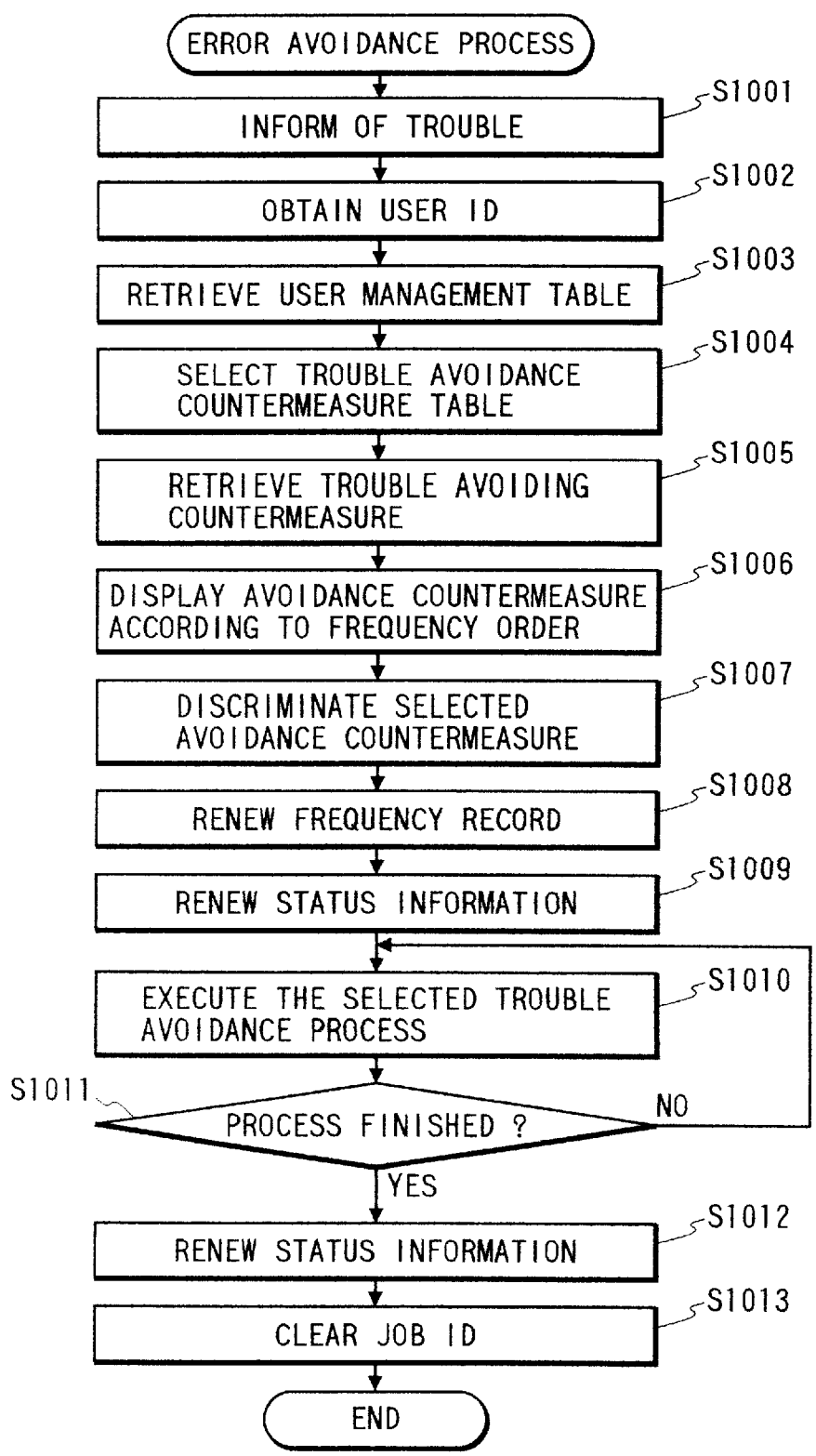
FIG. 10 is a flowchart of a trouble avoidance countermeasure selecting process executed when trouble occurs.

Referring next to FIG. 10, description will be made of the trouble avoidance selecting process of S908.

The CPU 114 informs the user of an occurrence of trouble and its cause through the operation unit 115 at S1001.

Subsequently at S1002, the CPU 114 obtains the user ID from the status information management table of the job trouble occurs, and at S1003, it retrieves the user management table in accordance with the user ID obtained. Then, at S1004 the CPU 114 selects the trouble avoidance countermeasure table for the user, and at S1005, it retrieves avoidance countermeasures in accordance with the content of the trouble. At S1006, the avoidance countermeasures are displayed on the operation unit 115, based on the history of the frequency of specification stored in the column 506, as alternatives sequentially from the avoidance countermeasure that is most frequently specified. When a user registered with a user name "Yamada" is taken by way of example, the frequency of specification of the avoidance countermeasures corresponding to each trouble is recorded as shown in FIG. 5. If the type of error is that there is no sheet of the designated size, alternative avoidance countermeasures "Print on Large Size Paper", "Retry till Paper is Fed", "Job Cancel" and "Print on Small Size Paper" are displayed in this order. When the two-side printing can not be performed due to a trouble of a two-side structure though two-side printing is designated by the user the alternative avoidance countermeasures "2 in 1 Print", "One-Side Print" and "Job Cancel" are displayed in this order. At S1007, a trouble avoidance Countermeasure selected by the user through the operation unit 115 is discriminated, and at S1008, the frequency data in the column 506 corresponding to the avoidance countermeasure selected is renewed. At S1009, the CPU 123 renews the content of error avoiding process in the column 807 of the status information management table from the previous one to the avoidance countermeasure selected by the user at S1007. The trouble avoiding process is then executed at S1010. After that, the CPU 123 determines at S1011 whether or not the process is finished. If finished, the CPU 123 renews the data in the column 804 of the status information management table at S1012 so as to indicate that the process is finished, and clears the job ID at S1013. The job is thus ended.

Figure 11:
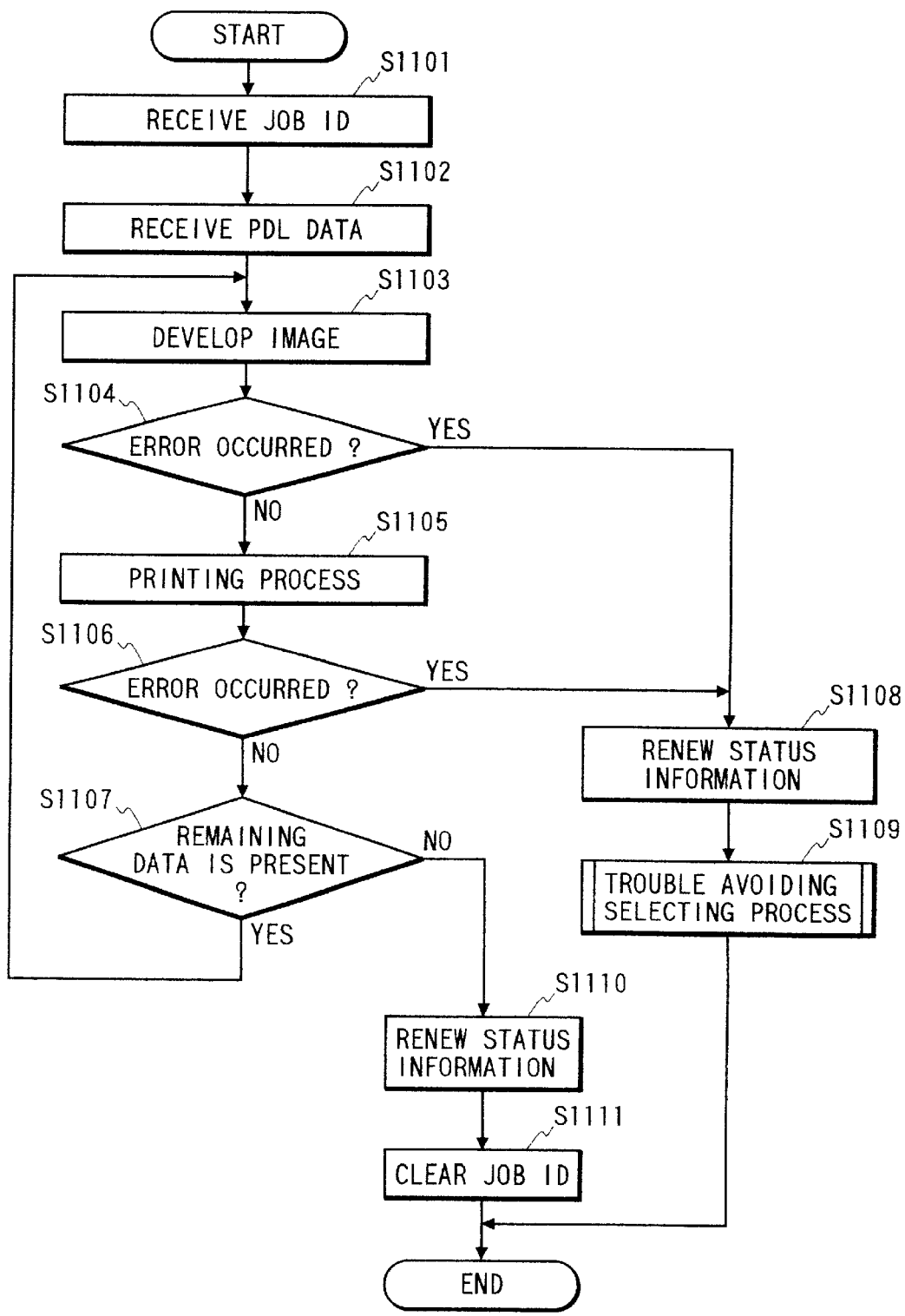
FIG. 11 is a flowchart showing an operation executed by a formatter unit 5.

Referring next to FIG. 11, description will be made of an operation of the entire apparatus in connection with the processing in the printer formatter unit 8.

The printer formatter unit 8 receives a job ID from the core unit 10 at S1101. The job ID is used for processing data to be received subsequently. The printer formatter unit 8 receives PDL data from the core unit 10 at S1102. At S1103, the printer formatter unit 8 analyzes the PDL data and develops an image in the image memory unit 9, and at S1104, it determines whether or not an error occurs during the image developing process. If occurrence of an error is determined, the operation advances to S1108. If the image developing process has been finished normally without any error, the operation shifts to a printing process of S1105. The CPU 123 of the core unit 10 determines at S1106 whether or not an error occurs during the printing process, and if occurrence of an error is determined, the operation advances to S1108. If the printing process has been finished normally without any error in the printer formatter unit 8 and the printer unit 2, the operation goes to S1107 in which it is determined as to whether remaining data to be developed is present or absent. If present, a sequence of processing steps from S1103 is repeated. If absent, the CPU 123 renews the data in the column 803 of the status information management table at S1110 so as to indicate that the processing in the printer formatter unit 8 is finished, and clears the job ID at S1111. The job is thus ended. The CPU 123 also renews the data in the column 804 of the status information management table at S1108 so as to indicate that an error occurs in the process, and transmits the data of the status information management table to the CPU 114. Then, the operation shifts to the trouble avoiding process of S1109 in which the CPU 114 displays alternative avoidance countermeasures corresponding to the content of the trouble in the order of the frequency of specification in the past, and instructs the user to select an optimum one for continuation of the processing. The details are described above with respect to FIG. 10.

Figure 12:
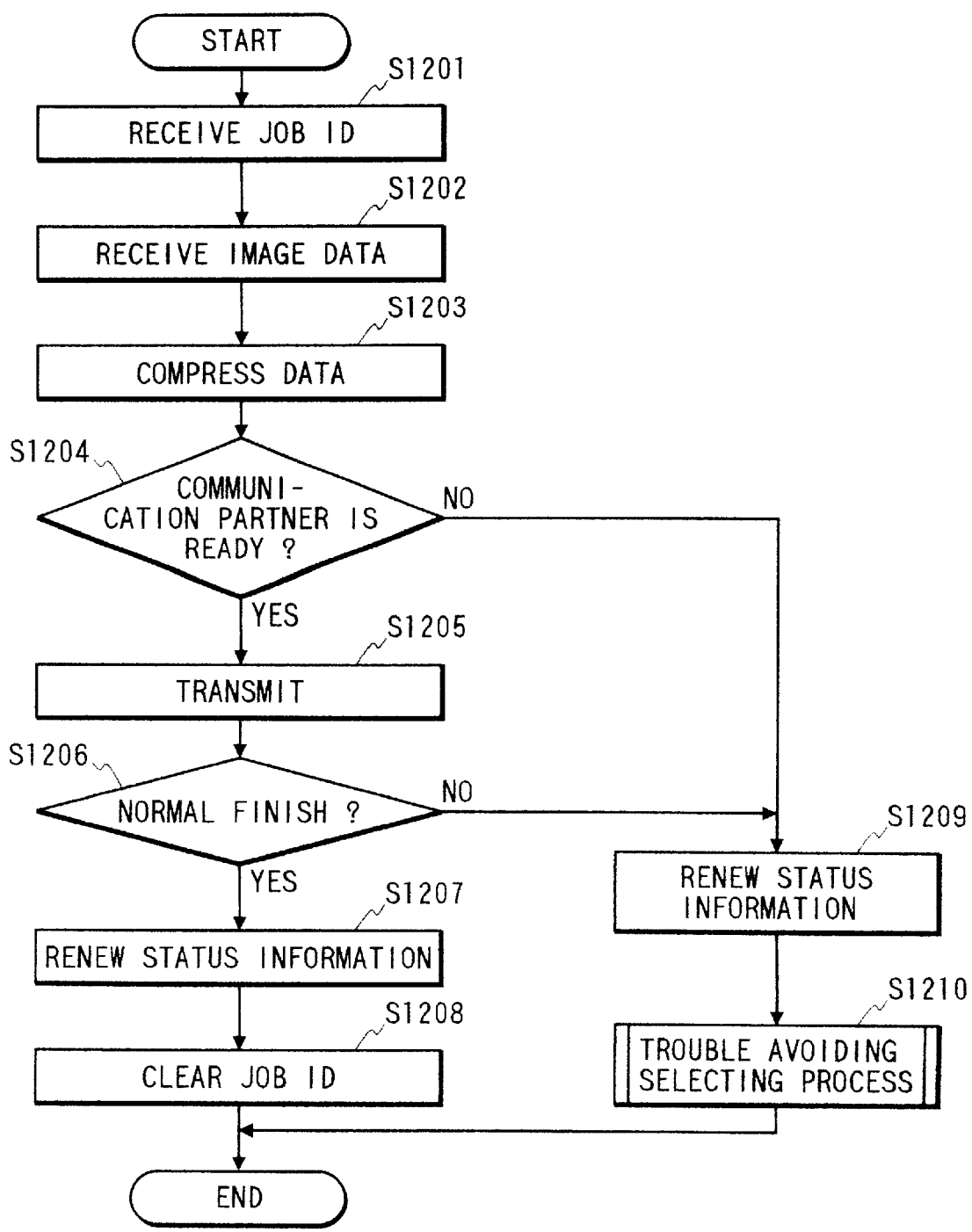
FIG. 12 is a flowchart showing an operation executed by a facsimile unit 4.

Referring next to FIG. 12, description will be made to operation of the entire apparatus in connection with the processing in the facsimile unit 4.

The facsimile unit 4 receives a job ID from the core unit 10 at S1201. The job ID is used for processing data to be received subsequently. The facsimile unit 4 receives image data from the reader unit 1 at S1202. At S1203, the facsimile unit 4 compresses (encodes) the received image data for facsimile transmission, and at S1204, it calls a communication partner according to the communication standard and determines whether or not the communication partner is ready for communication. If the communication is possible, the data is transmitted at S1205. If it is not possible, the CPU 123 renews the data in the column 804 of the status information management table at S1209 so as to indicate that an error has occurred. Then the facsimile unit 4 determines at S1206 whether or not the facsimile transmitting process has been finished normally. If a normal finish is determined, the CPU 123 renews the data in the column 803 of the status information management table at S1207 so as to indicate that the facsimile transmitting process is finished normally, and clears the job ID at S1208. The job is thus ended. If the facsimile unit 4 determines an abnormal finish at S1206, the CPU 123 renews the data in the column 804 of the status information management table at S1209 so as to indicate that an error occurring in the process. Then, the operation shifts to the trouble avoidance selecting process of S1210 in which the CPU 114 displays alternative avoidance countermeasures corresponding to the content of the trouble currently occurring in the order of the frequency of specification in the past, and instructs the user to select an optimum one for continuation of the processing. The details are described above with respect to FIG. 10.

During facsimile transmitting process, if an error occurs due to unexpected cut-off of the line currently connected, alternative avoidance countermeasures "Re-Transmit Pages Which Follow Error Page", "Re-Transmit All Pages" and "Job Cancel" are displayed in this order according to the table of FIG. 5.

Although in the above embodiment the avoidance countermeasures are displayed based on the history of the selection in the past, the following second embodiment shows a case where the avoidance countermeasures are pre-registered for each user. In the second embodiment, almost all of the portions are the same as those in the first embodiment except for the structure of the user management table, the avoidance countermeasure registering process and the avoidance countermeasure selecting process.

Hereinbelow, the second embodiment will be described.

Figure 13:
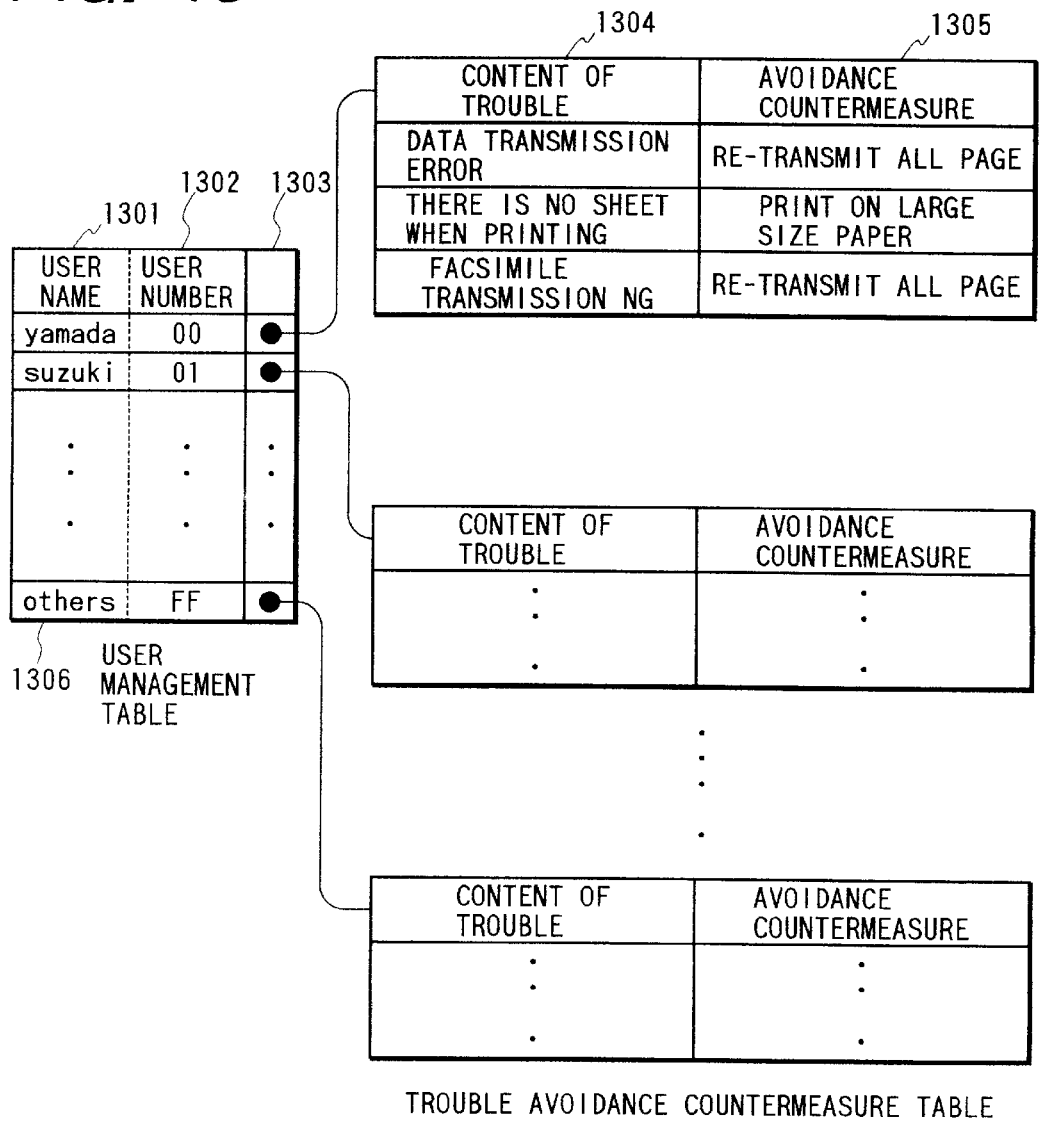
FIG. 13 is a diagram showing a user management table according to a second embodiment.

FIG. 13 shows a user management table for managing user information registered, in which a column 1301 is for storing user names, a column 1302 is for storing user IDs corresponding to individual user names and a column 1303 for storing corresponding positions of trouble avoidance countermeasure tables for individual users. The trouble avoidance countermeasure table 1303 is provided for each user, in which a column 1304 is for storing the content of troubles and a column 1305 for storing trouble avoidance countermeasures. The user management table is provided in a predetermined area of the memory 116.

Figure 14:
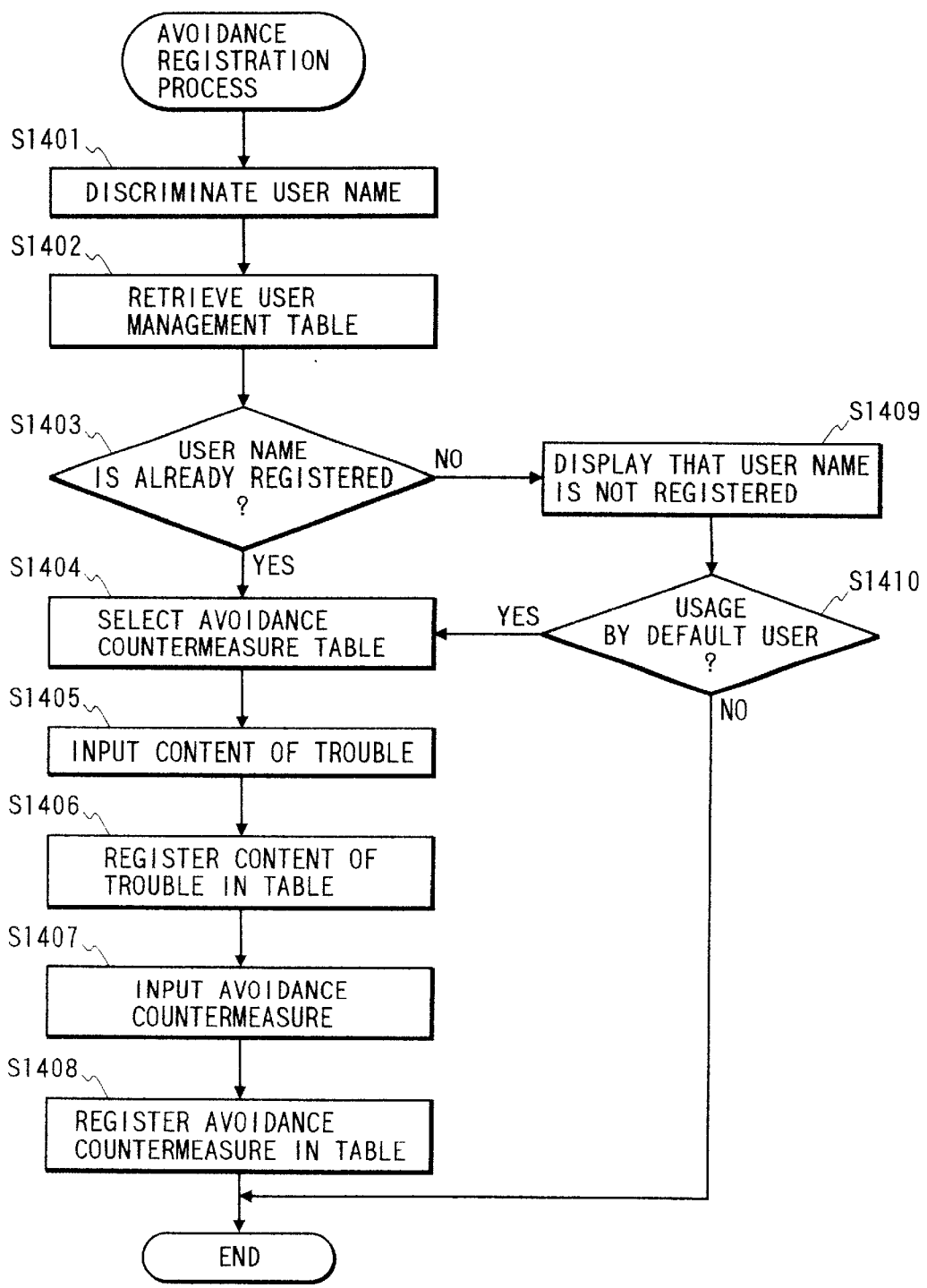
FIG. 14 is a flowchart of a trouble avoidance countermeasure registering process.

Referring next to FIG. 14, description will be made to a procedure for registering trouble avoidance countermeasures for each user.

At S1401, the CPU 114 discriminates a user name input from the operation unit 115 to identify the user whose avoidance countermeasures are to be registered. Subsequently, the CPU 114 retrieves the column 1301 of the user management table at S1402 and determines at S1403 whether or not the discriminated user name has already been registered. If registered, a corresponding avoidance countermeasure table is selected at S1404 by designating it in the user management table. If not registered, the CPU 114 instructs the operation unit 115 at S1409 to indicate that the discriminated user name has not been registered yet, and at S1410, to make the user select whether to use the default user. If the default user is used, an avoidance countermeasure table for the default user is selected in the column 1306 of the user management table at S1404. At S1405, the user inputs, through the operation unit 115, the content of troubles corresponding to avoidance countermeasures to be registered, and at S1406, the CPU 114 registers the content of troubles in the column 1304 of an avoidance countermeasure table for the user. Subsequently at S1407, the user inputs, through the operation unit 115, avoidance countermeasures corresponding to the content of troubles, and at S1408, the CPU 114 registers the input avoidance countermeasures in the column 1305 of the avoidance countermeasure table for the user.

Instead of user input of the content of troubles at S1405 and S1406, the CPU 114 can instruct the operation unit 115 to display the content of troubles serially so that the user can input corresponding avoidance countermeasures one by one in accordance with the content of troubles displayed.

Although the processing for receiving PDL data from the computer and transmitting the PDL data to the printer formatter unit 8, the processing in the printer formatter unit 8 and the processing in the facsimile unit 4 are the same as those in the first embodiment and, therefore, the description is omitted, respective trouble avoiding processes are different. In the second embodiment, a trouble avoiding process corresponding to the content of the trouble is automatically selected from the trouble avoidance countermeasure table for continuation of the processing.

Referring to FIG. 15, the trouble avoiding process will be described.

At S1501, the CPU 114 informs the user of occurrence of a trouble and its cause through the operation unit 115. At S1502, the CPU 123 obtains the user ID from the status information management table for the job the trouble occurs, and transmits it to the CPU 114. The CPU 114 retrieves the user management table at S1503 in accordance with the user ID obtained. Then, at S1504 a trouble avoidance countermeasure table for the user is selected, and at S1505, an avoidance countermeasure is retrieved in accordance with the content of the trouble. At S1506, the CPU 123 renews the content of the error avoiding process in the column 807 of the status information management table from the previous one to the avoidance countermeasure selected by the user at S1505. The trouble avoiding process selected is executed at S1507.

As shown in FIG. 13, in the case where the trouble avoidance countermeasures corresponding to the content of troubles have been pre-registered by the user having the user name "Yamada", when the cause of occurrence of the trouble is a data transmission error, the data transmission is required again. When the cause is no sheet in the printer formatter unit 8, printing is performed using large-sized paper. When the cause is facsimile transmission NG, re-transmission of all pages is required.

At S1508, the CPU 123 determines whether or not the process has been finished. If finished, the column 804 of the status information management table is renewed at S1509 so as to indicate that the process has been finished, and the job ID is cleared at S1510. The job is thus ended.

As described above, when an error occurs, alternative avoidance countermeasures are displayed, in the order of the frequency of specification in the past, as reference information that assists the user in judging and selecting an optimum trouble avoidance countermeasure, so that the user can use his or her own results in the past as a standard of judgment. It is therefore possible to lighten the work load of the user in recognizing and confirming the progress status of the processing of each job.

Further, when an error occurs, an individual trouble avoidance registration table is provided for each user and the processing is automatically continued according to the avoidance countermeasure previously specified by the user, so that the user does not need to recognize the progress status of the processing of each job. It is therefore possible to release the user from complex confirmation work and to execute an optimum trouble avoiding process required by the user even when an error occurs. The optimum trouble avoiding process can thus be provided for each user automatically.

The present invention is not limited by the above embodiments, and various modifications are possible within the scope of the appended claims.

What is claimed is:

1. A control apparatus for avoiding equipment abnormality comprising:

user recognition means for recognizing a user who has specified execution of a job;

abnormality detection means for detecting an abnormality that interferes with execution of the job;

storage means for storing both a plurality of avoidance countermeasures for avoiding the specific type of abnormality detected by said abnormality detection means and an execution frequency of those avoidance countermeasures by the specific user recognized by said recognition means, for each type of abnormality and for each user;

retrieving means for retrieving, when the abnormality is detected by said abnormality detection means, avoidance countermeasures from said storage means based on the user recognized by said user recognition means and the type of abnormality detected by said abnormality detection means; and display control means for causing a display unit to display one of the avoidance countermeasures retrieved by said retrieving means, based on the execution frequency of the avoidance countermeasures stored in said storage means.

2. An apparatus according to claim 1, wherein said display unit displays a plurality of executable avoidance countermeasures in the order of the frequency.

3. An apparatus according to claim 1, wherein said user recognition means has input means for inputting identification information for identifying the user.

4. An apparatus according to claim 1, wherein when the user can not be recognized by said user recognition means, said storage means stores the execution frequency of an avoidance countermeasure executed for an indefinite user.

5. An apparatus according to claim 4, wherein when the user can not be recognized by said user recognition means, said display unit displays avoidance countermeasures executable for the indefinite user.

6. An apparatus according to claim 1, further comprising user registration means for registering a user to be recognized by said user recognition means.

7. A control method for avoiding equipment abnormality comprising the steps of:
  (a) recognizing a user who has specified execution of a job;
  (b) executing the job;
  (c) detecting an abnormality that interferes with execution of the job;
  (d) storing in a memory both a plurality of avoidance countermeasures for avoiding the specific type of abnormality detected in said detecting step and an execution frequency of those avoidance countermeasures by the specific user recognized in said recognizing step, for each type of abnormality and for each user;
  (e) retrieving, when the abnormality is detected in said step (c), avoidance countermeasures from the memory on the basis of the user recognized in said step (a) and the type of abnormality detected in said step (c); and
  (f) causing a display unit to display the avoidance countermeasures retrieved in said step (e), based on the execution frequency of the avoidance countermeasures stored in the memory.

8. A method according to claim 7, wherein at step (f) a plurality of executable avoidance countermeasures are displayed in the order of the frequency.

9. A method according to claim 7, wherein at step (a) identification information for identifying the user is input.

10. A method according to claim 7, wherein when the user can not be recognized at step (a), the execution frequency of an avoidance countermeasure executed for an indefinite user is retrieved at step (e).

11. A method according to claim 10, wherein when the user can not be recognized at step (a), avoidance countermeasures executable for the indefinite user are displayed at step (f).

12. A method according to claim 7, further comprising a registration step of registering a user to be recognized at step (a).

13. A computer program product comprising a computer readable medium having computer program code, said product comprising:
  user recognizing process procedure codes for executing recognition of a user who has specified execution of a job;
  abnormality detecting process procedure codes for executing detection of an abnormality that interferes with execution of the job;
  storing process procedure codes for executing storage, into a memory, of both a plurality of avoidance countermeasures for avoiding the specific type of abnormality detected in said abnormality detecting process and an execution frequency of those avoidance countermeasures by the specific user recognized in said recognizing process, for each type of abnormality and for each user;
  retrieving process procedure codes for retrieving, when the abnormality is detected in said abnormality detecting process, avoidance countermeasures from the memory based on the user recognized in said user recognizing process and the type of the abnormality detected in said abnormality detecting process; and
  display process procedure codes for causing a display unit to display avoidance countermeasures retrieved in said retrieving process, based on the execution frequency of the avoidance countermeasure stored in the memory.

14. A product according to claim 13, wherein said displaying process procedure codes includes a code for executing display of a plurality of executable avoidance countermeasures in the order of the frequency.

15. A product according to claim 13, wherein said storing process procedure codes includes a code for executing storage of an avoidance countermeasure executed for an indefinite user when the user can not be recognized in said user recognizing process.

16. A product according to claim 15, wherein said displaying process procedure codes includes a code for executing display of avoidance countermeasures executable for the indefinite user when the user can not be recognized in said user recognizing process.

17. A product according to claim 13, further including user registering process procedure codes for registering a user to be recognized in said user recognizing process.

18. A control apparatus for avoiding equipment abnormality comprising:
  user recognition means for recognizing a user who has specified execution of a job;
  abnormality detection means for detecting an abnormality of the equipment;
  storage means for storing both a plurality of avoidance countermeasures for avoiding the specific type abnormality detected by said detection means and an execution frequency of those avoidance countermeasures by the specific user recognized by said recognition means, for each type of abnormality and for each user;
  retrieving means for retrieving, when the abnormality is detected by said abnormality detection means, plural avoidance countermeasures from said storage means based on the user recognized by said user recognition means and the type of abnormality detected by said abnormality detection means; and
  display control means for causing a display unit to display, in the order of the execution frequency stored in said storage means, the plural avoidance countermeasures retrieved by said retrieving means.

19. An apparatus according to claim 18, wherein said user recognition means has input means for inputting identification information for identifying the user.

20. An apparatus according to claim 18, further comprising user registration means for registering a user to be recognized by said user recognition means.

21. A control method for avoiding equipment abnormality comprising the steps of:
  (a) recognizing a user who has specified execution of a job in an equipment;
  (b) executing the job;
  (c) detecting an abnormality of the equipment;
  (d) storing in a memory both a plurality of avoidance countermeasures for avoiding the specific type of abnormality detected in said detecting step and an execution frequency of those avoidance countermeasures by the specific user recognized in said recognizing step, for each type of abnormality and for each user;

(e) retrieving, when the abnormality is detected in said step (c), plural avoidance countermeasures from the memory based on the user recognized in said step (a) and the type of the abnormality detected in said step (c); and (f) causing a display unit to display, in the order of the execution frequency stored in the memory, the plural avoidance countermeasures retrieved in said step (e).

22. A method according to claim 21, wherein at step (a) identification information for identifying the user is input.

23. A method according to claim 21, further comprising a step of registering a user to be recognized at step (a).

24. A computer program product comprising a computer readable medium having computer program code, said product comprising:

user recognizing process procedure codes for executing recognition of a user who has specified execution of a job in an equipment;

abnormality detecting process procedure codes for executing detection of an abnormality of the equipment;

storing process procedure codes for executing storage, into a memory, of a plurality of avoidance countermeasures for avoiding the specific type of abnormality detected in said detecting process and an execution frequency of those avoidance countermeasures by the specific user recognized in said recognizing process, for each type of abnormality and for each user;

retrieving process procedure codes for retrieving, when the abnormality is detected in said abnormality detecting process, plural avoidance countermeasures from the memory based on the user recognized in said user recognizing process and the type of abnormality detected in said abnormality detecting process; and display process procedure codes for causing a display unit to display, in the order of the execution frequency stores in the memory, the plural avoidance countermeasures retrieved in said retrieving process.

25. A product according to claim 24, wherein said user recognition process procedure codes includes a code for inputting identification information for identifying the user.

26. A product according to claim 24, further including user registering process procedure codes for registering a user to be recognized in said user recognizing process.

* * * * *

UNITED STATES PATENT AND TRADEMARK OFFICE
CERTIFICATE OF CORRECTION

PATENT NO. : 6,437,882 B1
DATED : August 20, 2002
INVENTOR(S) : Shinichi Kanematsu et al.

It is certified that error appears in the above-identified patent and that said Letters Patent is hereby corrected as shown below:

Column 1,
Line 34, "as indicates" should read -- that indicates --.

Column 6,
Line 54, "hand,, when" should read -- hand, when --.

Column 7,
Line 21, "a trouble" should read -- the trouble --;
Line 22, "user" should read -- user, --; and
Line 25, "Countermeasure" should read -- countermeasure --.

Column 9,
Line 53, "the, user" should read -- the user --.

Column 12,
Lines 10, 14 and 19, "includes" should read -- include --.

Column 14,
Line 17, "includes" should read -- include --.

Signed and Sealed this

Twenty-fourth Day of December, 2002

JAMES E. ROGAN
*Director of the United States Patent and Trademark Office*